United States Patent
Williams et al.

(10) Patent No.: US 6,188,436 B1
(45) Date of Patent: Feb. 13, 2001

(54) VIDEO BROADCAST SYSTEM WITH VIDEO DATA SHIFTING

(75) Inventors: Jim C. Williams, Anaheim, CA (US); Robert H. Plummer, Seattle, WA (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 08/792,629

(22) Filed: Jan. 31, 1997

(51) Int. Cl.[7] .................................................. H04N 7/24
(52) U.S. Cl. ............................................. 348/387; 348/390
(58) Field of Search .................................... 348/384, 385, 348/387, 390, 423, 426, 432, 6, 7, 12, 13; 455/6.1, 5.1, 3.1

(56) References Cited

U.S. PATENT DOCUMENTS

| 584,658 | 12/1998 | Uz et al. ............................... 348/419 |
| 4,093,823 | 6/1978 | Chu ....................................... 370/535 |
| 4,494,232 | 1/1985 | Dambrackas ........................ 270/412 |

(List continued on next page.)

FOREIGN PATENT DOCUMENTS

| 574 724 A2 | 12/1993 | (EP) . |
| 615 384 A2 | 9/1994 | (EP) . |
| 621 730 A2 | 10/1994 | (EP) . |
| 712 251 A2 | 5/1996 | (EP) . |
| 273653 | 1/1996 | (JP) . |
| 96/13125 | 5/1996 | (WO) . |

(List continued on next page.)

OTHER PUBLICATIONS

Abbas et al., "Performance analysis of an ATM statistical multiplexer with batch arrivals", IEE Prc.–Commun., vol. 141, No. 3, Jun. 1994, pp. 190–195.

Anderson et al., "Support For Continuous Media in the Dash System[1]", 1990 IEEE, pp. 54–61.

Beakley, "Channel Coding for Digital HDTV Terrestrial Broadcasting", IEEE Transaction on Broadcasting, vol. 37, No. 4, Dec. 1991, pp. 137–140

(List continued on next page.)

*Primary Examiner*—Bryan Tung
(74) *Attorney, Agent, or Firm*—John A. Crook; Michael W. Sales

(57) ABSTRACT

An apparatus for temporally shifting video data within a video signal is provided with a video data source for providing a video signal and a signal splitter for generating a first video data stream and a second video data stream, the first video data stream comprising video data in excess of a threshold. The apparatus includes means for temporally shifting the excess video data in the first video data stream relative to the second video data stream and means for recombining the first video data stream with the second video data stream after the first video data stream has been temporally shifted relative to the second video data stream. The means for temporally shifting the excess video data in the first video data stream relative to the second video data stream may include a first delay buffer for delaying the first video data stream by an adjustable time period and a second delay buffer for delaying the second video data stream by a fixed time period.

18 Claims, 4 Drawing Sheets

U.S. PATENT DOCUMENTS

| | | | |
|---|---|---|---|
| 4,587,514 | 5/1986 | Schas et al. | 340/347 DD |
| 4,626,829 | 12/1986 | Hauck | 340/347 DD |
| 4,888,779 | 12/1989 | Karabed et al. | 371/43 |
| 4,918,523 | 4/1990 | Simon et al. | 358/133 |
| 4,975,771 | 12/1990 | Kassatly | 358/146 |
| 5,005,171 | 4/1991 | Modisette, Jr. et al. | 370/110.1 |
| 5,038,389 | 8/1991 | Mizuno | 382/56 |
| 5,097,261 | 3/1992 | Langdon, Jr. et al. | 341/51 |
| 5,115,309 | 5/1992 | Hang | 358/133 |
| 5,122,873 | 6/1992 | Golin | 358/133 |
| 5,128,754 | 7/1992 | Dhein | 358/105 |
| 5,136,375 | 8/1992 | Citta et al. | 358/133 |
| 5,216,503 | 6/1993 | Paik et al. | 358/133 |
| 5,231,494 | 7/1993 | Wachob | 358/146 |
| 5,291,281 | 3/1994 | Paik et al. | 348/384 |
| 5,319,707 | 6/1994 | Wasilewski et al. | 380/14 |
| 5,361,096 | 11/1994 | Ohki et al. | 348/387 |
| 5,367,334 | 11/1994 | Nishino et al. | 348/387 |
| 5,376,968 | 12/1994 | Wu et al. | 348/413 |
| 5,392,223 | 2/1995 | Caci | 364/514 |
| 5,400,401 | 3/1995 | Wasilewski et al. | 380/9 |
| 5,432,790 | 7/1995 | Hluchyj et al. | 370/412 |
| 5,440,334 | 8/1995 | Walters et al. | 348/6 |
| 5,442,626 | 8/1995 | Wei | 370/20 |
| 5,446,916 | 8/1995 | Derovanessian et al. | 395/800 |
| 5,448,568 | 9/1995 | Delpuch et al. | 372/94.2 |
| 5,461,619 | 10/1995 | Citta et al. | 370/83 |
| 5,475,716 | 12/1995 | Huang | 375/354 |
| 5,479,210 | 12/1995 | Cawley et al. | 348/390 |
| 5,495,291 | 2/1996 | Adams | 348/390 |
| 5,499,245 | 3/1996 | Lee et al. | 370/94.2 |
| 5,506,844 | 4/1996 | Rao | 370/84 |
| 5,509,017 | 4/1996 | Brandenburg et al. | 370/112 |
| 5,515,377 | 5/1996 | Horne et al. | 370/94.1 |
| 5,521,945 | 5/1996 | Krudson | 375/341 |
| 5,532,744 | 7/1996 | Akiwumi-Assani et al. | 348/390 |
| 5,533,009 | 7/1996 | Chen | 370/17 |
| 5,541,852 | 7/1996 | Eyuboglu et al. | 364/514 C |
| 5,548,532 | 8/1996 | Manand et al. | 364/514 C |
| 5,550,589 | 8/1996 | Shiojiri et al. | 348/387 |
| 5,550,590 | 8/1996 | Sakazawa et al. | 348/387 |
| 5,557,419 | 9/1996 | Muto | 348/408 |
| 5,563,961 | 10/1996 | Rynderman et al. | 382/239 |
| 5,583,562 | 12/1996 | Birch et al. | 348/12 |
| 5,592,470 | 1/1997 | Rudrapatna et al. | 370/320 |
| 5,594,491 | 1/1997 | Hodge et al. | 378/7 |
| 5,629,736 | 5/1997 | Haskell et al. | 348/387 |
| 5,633,683 | 5/1997 | Rosengren et al. | 348/385 |
| 5,646,942 | 7/1997 | Oliver et al. | 370/112 |
| 5,675,732 | 10/1997 | Majeti et al. | 348/384 |
| 5,682,387 | 10/1997 | Satoh | 370/468 |
| 5,687,163 | 11/1997 | Fox et al. | 370/207 |
| 5,708,664 * | 1/1998 | Budge | 348/385 |
| 5,719,632 | 2/1998 | Hoang et al. | 348/419 |
| 5,757,801 | 5/1998 | Arimilli | 370/444 |
| 5,771,316 | 6/1998 | Uz | 382/239 |
| 5,790,177 | 8/1998 | Kassatly | 348/13 |
| 5,793,425 | 8/1998 | Balakrishman | 348/387 |
| 5,812,334 | 9/1998 | Behrens et al. | 360/40 |
| 5,847,760 | 12/1998 | Elamaliach et al. | 348/390 |
| 5,862,140 * | 1/1999 | Shen | 348/387 |

OTHER PUBLICATIONS

Dixit et al., "Video Traffic Smoothing and ATM Multiplexer Performance", 1991 IEEE, pp. 8B.3.1–8B.3.5.

Eleftheriadis et al., "Optimal Data Partitioning of MPEG–2 Coded Video", 1994 IEEE, pp. 273–277.

Eng et al., "Time–Compression Multipolexing (TCM) of Three Broadcast–Quality TV Signal on a Satellite Transponder", The Bell System Technical Journal, vol. 62, No. 10, Part 1, Dec. 1983, pp. 2853–2863.

Garcia et al., "Statistical Multiplexing Gain Using Space Priority Mechanism", 1991 IEEE, pp. 27.3.1–27.3.5.

Gemmell et al., "Multimedia Storage Servers: A Tutorial", IEEE, May 1995, pp. 40–49.

Guha et al., "Multichannel Joint Rate Control of VBR MPEG Encoded Video for DBS Applications", IEEE Transactions on Consumer Electronics, vol. 40, No. 3, Aug. 1994, pp. 6616–623.

Tes et al., "Video Aggregation: An Integrated Video Compression and Multiplexing Scheme for Broadband Networks", 1995 IEEE, pp. 439–446.

Haskell et al., "Multiplexing of Variable Rate Encoded Streams", IEEE Transactions on Circuits and Systems for Video Technology, vol. 4, No. 4, Aug. 1994, pp. 417–424.

Haskell et al., "Variable BIT–Rate Video Coding for ATM and Broadcast Applications", 1993 IEEE, pp. I–114 —i116.

Hulyalkar et al., "Advanced Digital HDTV Transmission System for Terrestrial Video Simulcasting", IEEE Journal on Selected Areas In Communications, vol. 11, No. 1, Jan. 1993, pp. 119–126.

Inoue et al., "Encoding and Decoding in the 60MHz NTSC–Compatible Widescreen Television System", IEEE Transactions on Circuits and Systems for Video Technology, vol. 1, No. 1, Mar. 1991, pp. 49–58.

Kao et al., "Time–Multiplexed Analog Transmission ot Three Broadcast–Quality Television Channels Through One Satellite Transponder", IEEE Journal On Selected Areas In Communications, vol. SAC–5, No. 4, May 1987, pp. 676–684.

Keesman et al., "Analysis of Joint Bit–Rate Control in Multi–Program Image Coding", SPIE vol. 2308, 1994, pp. 1906–1917.

Krunz et al., "Statistical Characteristics and Multiplexing of MPEG Strea,s", 1995 IEEE, pp. 455–462.

Kuo, Geng–Sheng, "A New Generalized Framework for VOD Transmission on Future High–Speed BISDN", IEEE Transactions on Consumer Electronics, vol. 42, No. 1, Feb. 1996. pp. 101–111.

Lee et al., "Dynamic Bandwidth Allocation for Multiple VBR MPEG Video Sources", 1994 IEEE, pp. 268–272.

Liew et al., "Video Aggregation: Adapting Video Traffic for Transport Over Broadband Network by Integrating Data Compression and Statistical Multiplexing", IEEE Journal On Selected Areas In Communications, vol. 14, No. 6, Aug. 1996, pp. 1123–1137.

Pancha et al., "Bandwidth–Allocation Schemes for Variable–Bit–Rate MPEG Sources in ATM Networks", IEEE Transactions on Circuits and Systems for Video Technology, vol. 3, No. 3, Jun. 1993, pp. 190–198.

Panchanathan et al., "Robust Algorithms for Image Transmission over ATM Networks", SPIE vol. 2308, 1994, pp. 1918–1923.

Reininger et al., "Statistical Multiplexing of VBR MPEG Compressed Video on ATM Networks", 1993 IEEE, pp. 919–926.

Saleh et al., "Simulation Analysis of a Communication Link with Statistically Multiplexed Bursty Voice Sources", IEEE Journal On Selected Areas In Communications, vol. 11, No. 3, Apr. 1993, pp. 432–442.

Tse et al., "Statistical Multiplexing of Multiple Time–Scale Markov Stream ", IEEE Journal On Selected Areas In Communications, vol. 13, No. 6, Aug. 1995, pp. 1028–1038.

Vin et al., "Designing a Multiuser HDTV Storage Server", IEEE Journal On Selected Areas On Selected Area In Communications, vol. 11, No. 1, Jan. 1993, pp. 153–164.

Wu et al., "Computational Methods for Performance Evaluation of a Statistical Multiplexer Supporting Bursty Traffic", IEEE Transactions On Networking, vol. 4, No. 3, Jun. 1996, pp. 386–397.

Technology Demonstration by DMV, Imedia and Silicon Graphics, NAB '96, Apr. 15–18, 2 pages.

Imedia Corporation, Company Backgrounder, Apr. 1996, 6 pages.

* cited by examiner

VIDEO BROADCAST SYSTEM WITH VIDEO DATA SHIFTING

BACKGROUND OF THE INVENTION

The present invention relates to a video broadcast system which incorporates an apparatus for temporally shifting video data within a video signal for a single video program.

Conventional video broadcast systems for transmitting video signals from a central location to a plurality of remote viewing locations may be of several different types, including cable television systems and satellite-based broadcast systems. Since the overall bandwidth of a video broadcast system is limited, there is a limit to the number of video channels that can be included in a broadcast transmission.

U.S. Pat. No. 5,216,503 to Paik, et al. discloses a statistical multiplexing apparatus which is used to selectively compress a plurality of video signals prior to being broadcast. In the Paik, et al. system, each video signal is provided to an encoder prior to being broadcast. Each encoder is connected to a respective buffer, which is in turn connected to a multiplexer. Each encoder is connected to a controller, which generates coding level commands to control the degree to which the encoders compress the video signals.

SUMMARY OF THE INVENTION

The invention is directed to an apparatus for temporally shifting video data within a video signal. The apparatus is provided with a video data source for providing a video signal and a signal splitter for generating a first video data stream and a second video data stream, the first video data stream comprising video data in excess of a threshold. The apparatus includes means for temporally shifting the excess video data in the first video data stream relative to the second video data stream and means for recombining the first video data stream with the second video data stream after the first video data stream has been temporally shifted relative to the second video data stream.

The means for temporally shifting the excess video data in the first video data stream relative to the second video data stream may include a first delay buffer for delaying the first video data stream by an adjustable time period and a second delay buffer for delaying the second video data stream by a fixed time period. The apparatus may also include a complexity detector for generating a complexity signal relating to the complexity of the video signal and a video encoder for encoding the video signal based upon the complexity signal before the video signal is transmitted to the signal splitter.

The video signal shifting apparatus may be included as part of a video broadcast system for generating a plurality of program signals and broadcasting the program signals. The video broadcast system may include a first program generator for generating a first program signal, a second program generator for generating a second program signal, a multiplexer for combining the first and second program signals, and means for broadcasting the program signals to a plurality of remote locations. The broadcasting means may include a transmitter coupled to receive the program signals from the multiplexer, a satellite coupled to receive the program signals from the transmitter, a receiver for receiving signals from the satellite, and a decoder connected to receive signals from the receiver.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
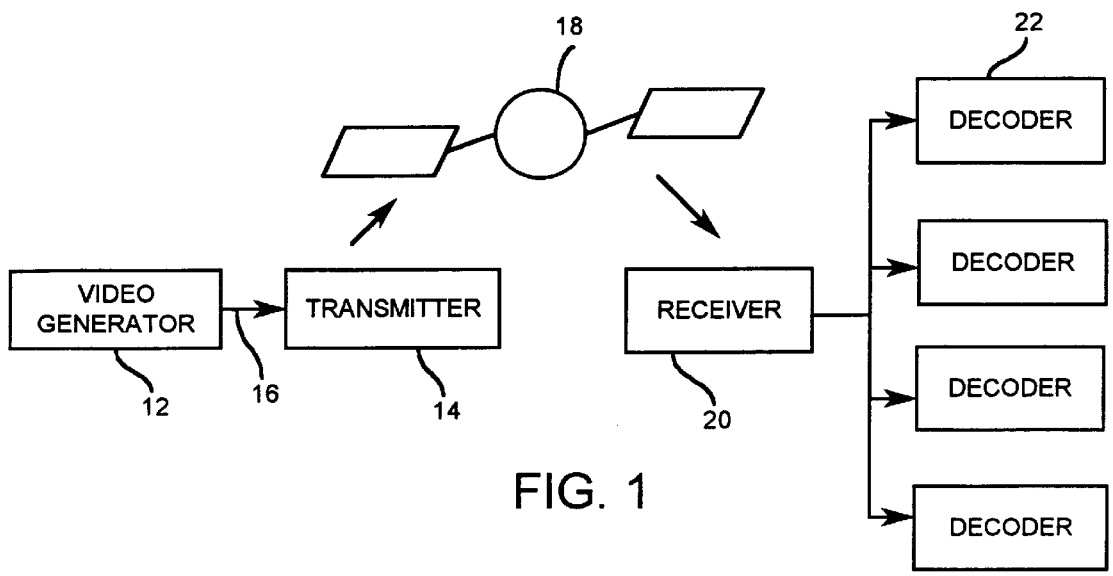
FIG. 1 is a block diagram of a preferred embodiment of a video broadcast system in accordance with the invention.

A preferred embodiment of a video broadcast system 10 in accordance with the invention is illustrated in FIG. 1. Referring to FIG. 1, the system 10 includes a video generator 12 connected to transmit a multiplexed video data stream to a conventional transmitter 14 via a data link 16. The transmitter 14 transmits the video data stream to a satellite 18, and video data is broadcast by the satellite 18 to a plurality of conventional receivers 20, one of which is shown in FIG. 1. Each receiver 20 may correspond to a house or a multiple dwelling unit, such as an apartment building. Where the receiver 20 is used for a multiple dwelling unit, the receiver 20 is connected to a plurality of decoders 22, each of which corresponds to a separate dwelling unit within the multiple dwelling unit.

Figure 2:
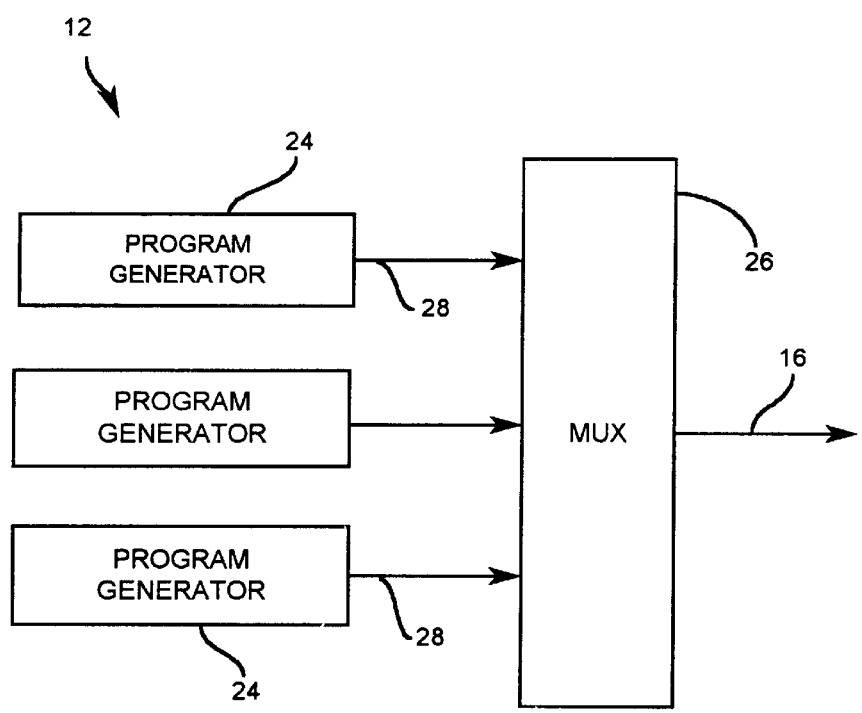
FIG. 2 is a block diagram of the video generator shown schematically in FIG. 1.

FIG. 2 illustrates a block diagram of the video generator 12 shown schematically in FIG. 1. Referring to FIG. 2, the video generator 12 includes a plurality of program generators 24, each of which is connected to a multiplexer 26 via a respective line 28. Each program generator 24 generates a program signal corresponding to a single program, such as a movie or sporting event. Although only three program generators 24 are shown, it should be understood that a larger number of program generators 24 would typically be used.

Figure 3:
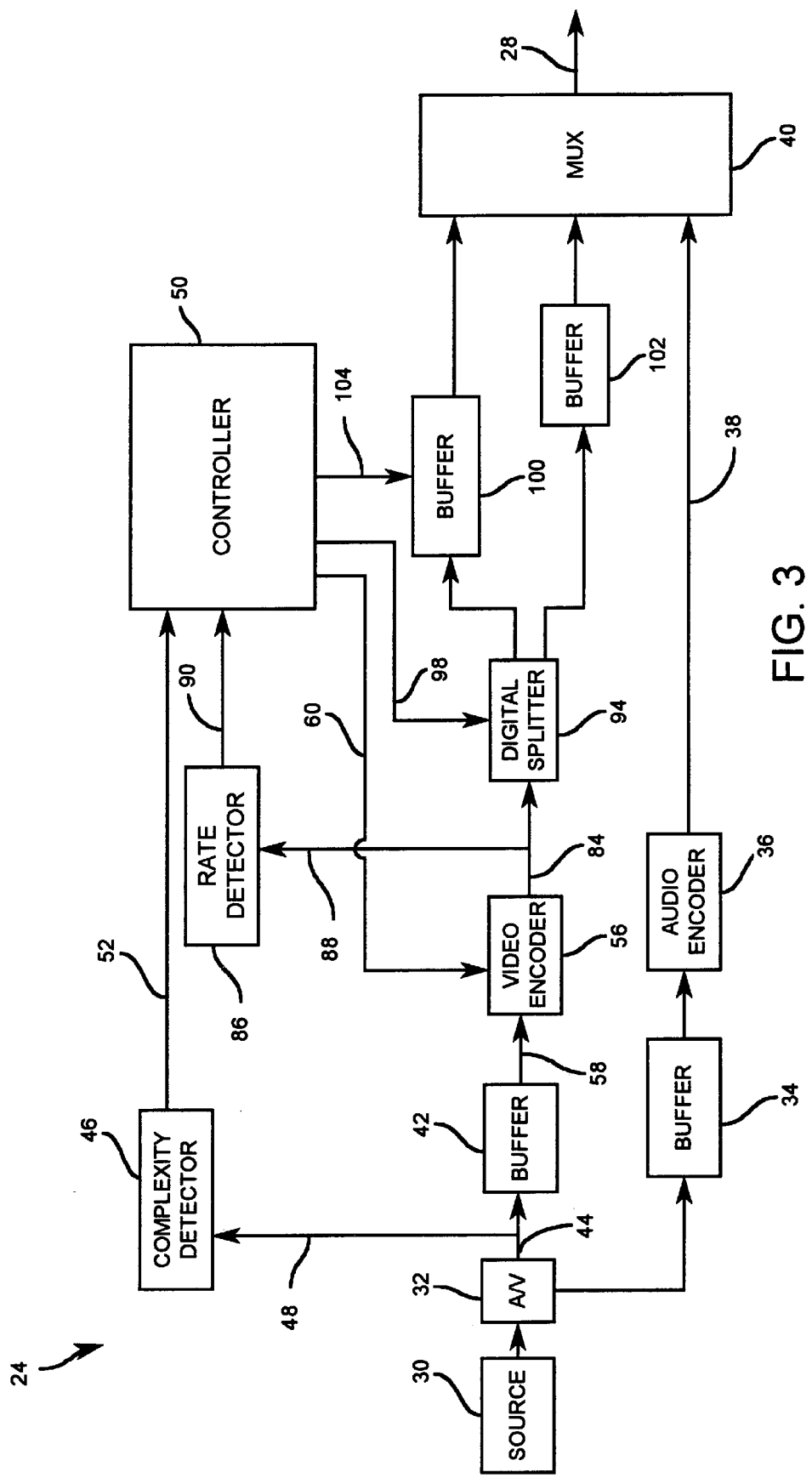
FIG. 3 is a block diagram of one of the program generators shown schematically in FIG. 2.

FIG. 3 illustrates a block diagram of one of the program generators 24 shown schematically in FIG. 2. Referring to FIG. 3, each program generator 24 includes a program source 30 for providing an audiovisual signal. The audiovisual signal is provided to an audio/video (A/V) separator 32, which separates the audio portion of the signal from the video portion.

The audio signal generated by the A/V separator 32 is transmitted to a delay buffer 34, which delays the audio signal by a period of time corresponding to the time required for a controller 50 to generate a compression factor for a video encoder 56, as described below. The audio signal is provided to an audio encoder 36, which compresses the audio signal in a conventional manner, and the compressed audio signal is provided by a line 38 to a multiplexer 40.

The video signal generated by the A/V separator 32 is provided to a delay buffer 42 via a line 44 and to a complexity detector 46 via a line 48. The complexity detector 46 generates a complexity signal having a magnitude that is representative of the complexity of the video signal and transmits the complexity signal to a controller 50 via a line 52. The complexity signal may be, for example, a signal representing the bit rate of the video signal, for example in bits/second. The type of complexity signal generated is not considered important to the invention.

After a predetermined delay within the delay buffer 42, the video signal is transmitted to a video encoder 56, via a line 58, where it is compressed, for example, in accordance with a standard MPEG (Moving Pictures Experts Group) compression protocol. The rate at which the video encoder 56 compresses the video signal is controlled by a compression signal, for example a quantizing factor, that is generated by the controller 50 and transmitted to the video encoder 56 via a line 60.

The buffer 42 is a fixed delay buffer which delays the video signal by a fixed time which corresponds to the processing time of the controller 50 required to determine the quantization factor from the complexity signal generated by the complexity detector 46 and transmit the quantization factor to the video encoder 56 via the line 60.

Figure 4:
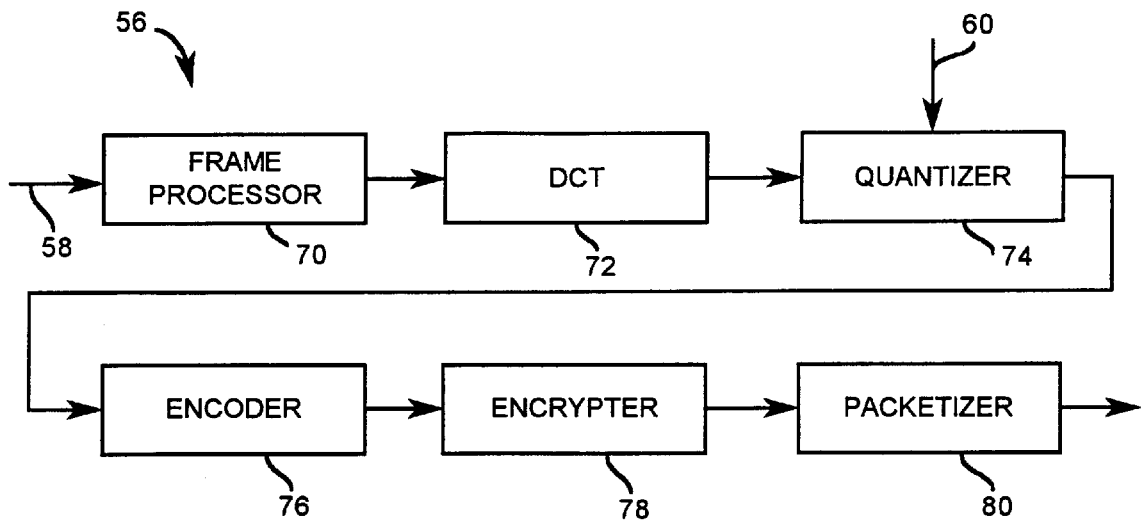
FIG. 4 is a block diagram of an encoder used in the video broadcast system.

FIG. 4 illustrates one possible embodiment of the video encoder 56, which is used to compress a video signal in accordance with a standard MPEG compression protocol. Referring to FIG. 4, the encoder 56 includes a conventional frame processor 70 that separates the video signal provided on the line 58 into video frames (e.g. 24 video frames per second). A discrete-cosine transform (DCT) circuit 72 converts the video signal from the frame processor 70 into a plurality of transform coefficients, each transform coefficient being represented by a plurality of data bits.

The video signal is then provided to a conventional quantizer 74 which compresses the video signal by reducing a number of data bits from the transform coefficients based upon the magnitude of a quantizing factor, referred to generally as a compression factor, provided to the quantizer 74 via the line 60 from the controller 50. The video signal is then encoded by an encoder 76, such as a variable-length encoder, in a conventional manner, and if necessary or desired, the video signal may be encrypted by an encrypter 78. The video signal is then converted into data packets suitable for broadcast transmission by a packetizer 80. The particular design of the video encoder 56 is not considered important to the invention, and alternative designs could be used. For example, the encoder disclosed in U.S. Pat. No. 5,216,503 to Paik, et al., the disclosure of which is incorporated herein by reference, could be used.

The rate at which the video signal is compressed by the video encoder 56, which is determined by the compression signal transmitted to the video encoder 56 on the line 60, is determined based on the complexity signal generated by the complexity detector 46. For example, relatively complex portions of an action movie may be compressed at a lower rate, to maintain picture quality, than less complex portions.

After being compressed, the video signal is transmitted to a rate detector 86, such as a bit-rate detector, via a line 88. The rate detector 86 continuously generates a rate signal representative of the bit rate of the video signal and transmits the rate signal to the controller 50 via a line 90. The video signal is also provided to a digital splitter 94 via a line 96. Under the control of a threshold signal generated by the controller 50 and transmitted to it via a line 98, the digital splitter 94 splits any portion of the video signal which exceeds a bit rate threshold and transmits the excess video data to an adjustable delay buffer 100. The remaining portion of the video signal is transmitted from the splitter 94 to a fixed-delay buffer 102.

For example, if the maximum bit rate threshold represented by the threshold signal on the line 98 is 10 megabits/second (Mbps) and the bit rate of the video signal into the splitter 94 is 12 Mbps (as determined by the rate detector 86), the fixed-delay buffer 102 will be provided with video data from the video signal at a rate of 10 Mbps, while the adjustable delay buffer 100 will be provided with data from the video signal at a rate of 2 Mbps. If the bit rate of the video into the splitter 94 does not exceed the maximum bit rate threshold, the entire video signal is provided to the buffer 102 and no video data is provided to the buffer 100. The threshold signal provided to the digital splitter 94 on the line 98 may correspond to a constant bit rate threshold, or it may be dynamically varied by the controller 50 during transmission of the video signal.

As described below, the controller 50 generates a variable delay signal and transmits it to the adjustable delay buffer 100 via a line 104 to control the time delay of the video data provided to the buffer 100. That time delay is controlled by continuously specifying the bit rate at which video data is output from the buffer 100.

Figure 5:
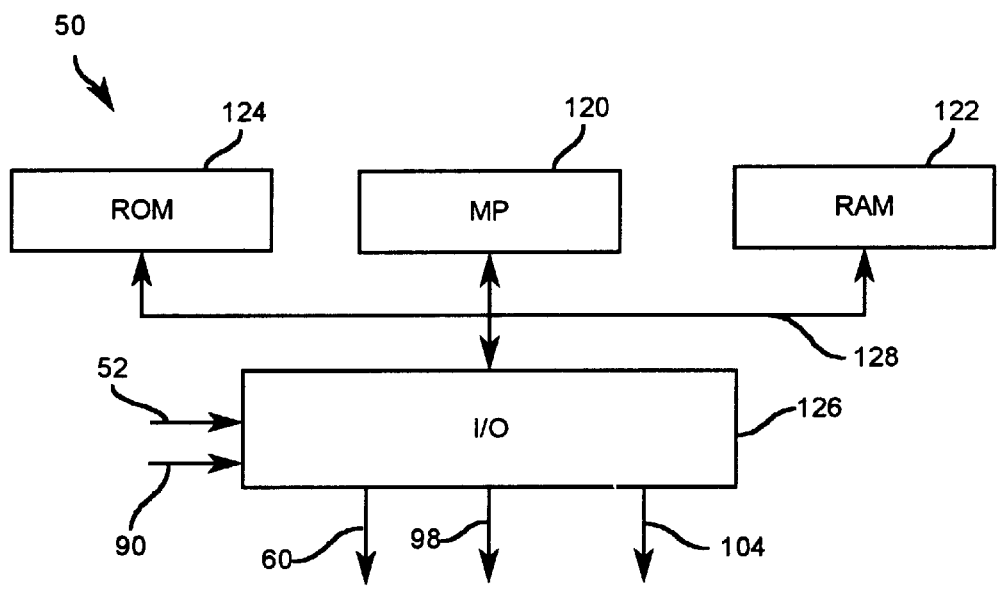
FIG. 5 is a block diagram of a controller used in the video broadcast system.

Referring to FIG. 5, the controller 50 may take the form of a conventional computer system having a microprocessor (MP) 120, a random-access memory (RAM) 122, a program memory such as a read-only memory (ROM) 124, and an input/output (I/O) circuit 126, all of which are interconnected via an address/data bus 128. The overall operation of the controller 50 is controlled by a computer program stored in the program memory 124 and executed by the microprocessor 120.

In operation, the controller 50 causes any excess video data that is transmitted to the buffer 100 to be temporally shifted relative to the video data in the buffer 102 so that, when the temporally shifted excess video data is recombined by the multiplexer 40 with the video data from the buffer 102, the bit rate of the recombined video signal does not exceed the maximum bit rate threshold set by signal on the line 98.

To accomplish the temporal shifting, the buffer 102 may provide a relatively long fixed time delay, such as 20 milliseconds (ms) and the buffer 100 may be controlled to provide a variable time delay, such as between 0 to 40 ms. If those time delays were used, it should be noted that excess video data (corresponding to a burst or "peak") could be shifted ahead (by setting the time delay of the buffer 100 to be less than 20 ms) or shifted behind (by setting the time delay of the buffer 100 to be greater than 20 ms) its original temporal location within the video signal.

Figure 6:
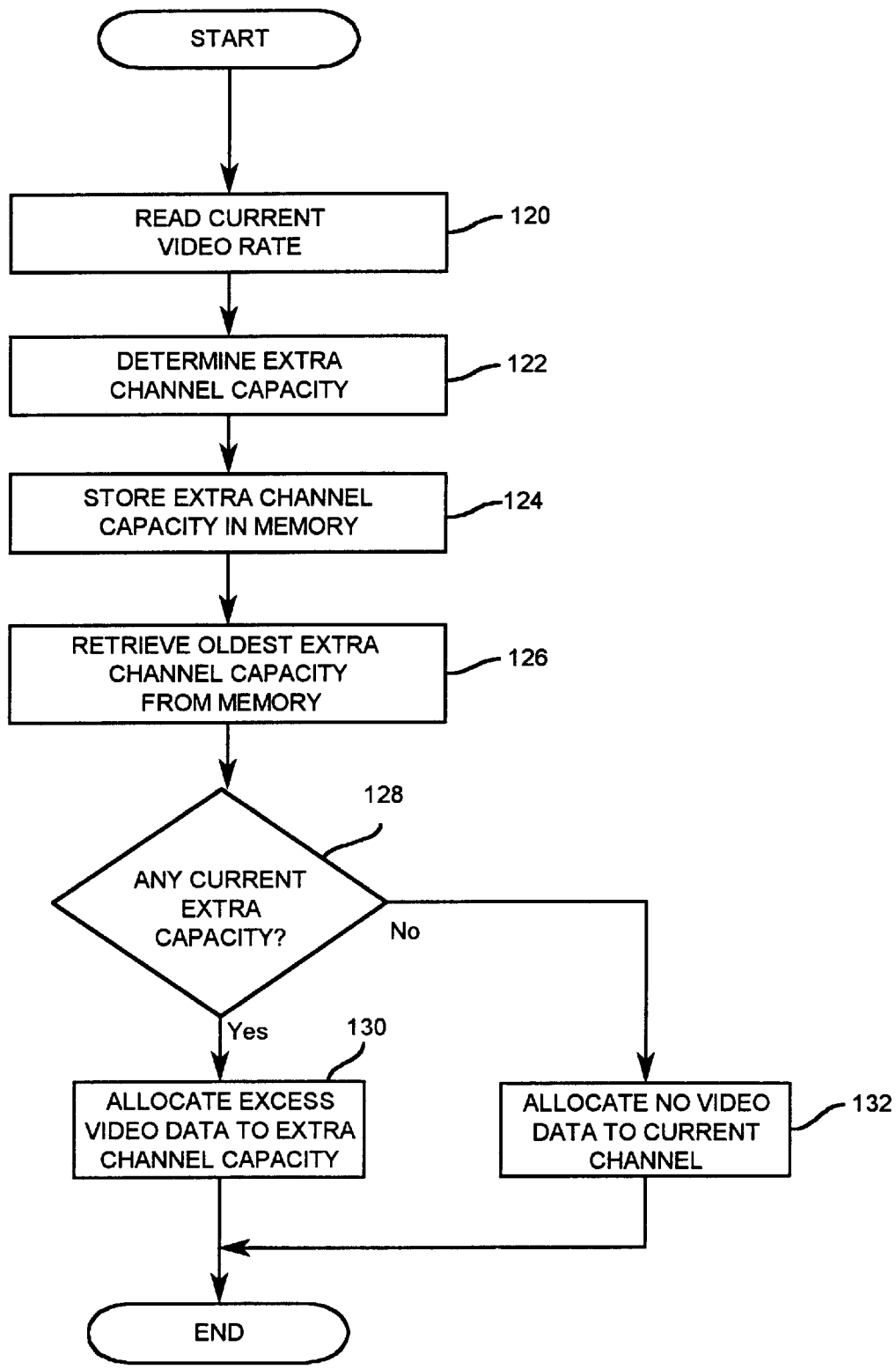
FIG. 6 is a flowchart which illustrates the operation of one of the program generators shown in FIG. 2.

FIG. 6 is flowchart of a computer program routine which controls the operation of the controller 50 in performing the temporal data shifting described above. The computer program routine, which may be an interrupt service routine, is repeatedly performed at a predetermined rate, such as every two milliseconds. The rate may be determined by a timer which periodically generates interrupts.

Referring to FIG. 6, each time the routine is performed, the current bit rate of the video signal generated by the rate detector 86 is read by the controller 50 at step 120. At step 122, the extra channel capacity (if any) of the video signal is determined based on the current bit rate and the maximum bit rate threshold represented by the threshold signal on the line 98. The amount of extra channel capacity (in bps) is determined based on the difference between those two bit rates. If the current bit rate is greater than or equal to the maximum bit rate threshold, the extra channel capacity is set to zero.

At step 124, the extra channel capacity (either a positive or zero bit rate) determined at step 122 is stored in a memory (not shown). The memory may be a first-in-first-out memory having a predetermined number of memory locations. The number of memory locations may be selected so that the arithmetic product of 1) the number of memory locations and 2) the time between successive performances of the routine of FIG. 6 is substantially equal to the fixed delay provided by the buffer 102. For example, where the buffer 102 provides a delay of 40 ms and the routine of FIG. 6 is performed every two milliseconds, twenty memory locations in the FIFO memory could be provided.

At step 126, the oldest value of the extra channel capacity previously stored in the memory during a prior performance of step 124 is retrieved from the memory. As described above, this value would have been stored in the memory for a duration substantially equal to the fixed time delay provided by the buffer 102. This is desirable since the value of the excess channel capacity was determined based on the video rate (detected by the rate detector 86) at a point in time corresponding to the time at which the video signal was input to the digital splitter 94, while the extra video data in the buffer 100 is added (by the multiplexer 40) to the video signal output from (and having been delayed by) the buffer 102.

At step 128, the value of the extra channel capacity retrieved from the memory at step 126 is compared with zero to determine whether there is extra channel capacity for the video signal currently being output by the fixed delay buffer 102. If there is (non-zero) extra channel capacity, the program branches to step 130 where any excess video data (if any) stored in the adjustable delay buffer 100 is allocated to the video signal being output from the fixed delay buffer 102. This step may be performed by setting the output data rate of the adjustable delay buffer 100 to equal the extra channel capacity (in bps).

If there is no non-zero extra channel capacity as determined at step 128, the routine branches to step 132 where the output bit rate of the video data from the adjustable delay buffer 100 is set to zero to prevent any excess video data from being combined (by the multiplexer 40) with the video signal being output from the buffer 102.

As a consequence of shifting the excess video data to portions of the video signal which have a bit rate below the maximum, the bit rate of the video signal, when recombined by the multiplexer 40, will not exceed the maximum bit rate threshold.

After the program signals are broadcast and received by the receiver 20 (FIG. 1), the video portion of each of the program signals is decoded to return the temporally shifted video data portions to their original locations in the video signals. In this decoding process, the video portion of each program signal could be decoded by providing it to a signal splitter (not shown) which splits the video signal, on a packet-by-packet basis, into two data streams, including a first data stream comprising the video packets that were not temporally shifted and a second data stream comprising the video packets that were temporally shifted. As shown in FIG. 3 described above, the video packets in the first data stream could be provided to an adjustable delay buffer (not shown), the video packets in the second data stream could be provided to a fixed delay buffer (not shown), and the outputs of the two buffers could be combined by a multiplexer (not shown). The adjustable delay buffer could be controlled by a controller (not shown) to cause the shifted video packets to be reinserted into their original locations within the first data stream.

The data splitter used for decoding purposes is capable of differentiating shifted video packets from unshifted video packets because each video packet is provided with a time stamp (which was inserted when the video signal was encoded by the encoder 56 shown in FIG. 3). The adjustable delay provided to the buffer containing the shifted video packets on the decoder side could be controlled based upon the time differential between the time stamps of the unshifted video packets and the time stamps of the shifted video packets.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A video broadcast system for generating a plurality of program signals and broadcasting said program signals, said system comprising:

a first program generator for generating a first program signal, said first program generator comprising:
    a first video data source for providing a first video signal;
    a first signal splitter coupled to receive said first video signal, said signal splitter generating a first video data stream and a second video data stream, said first video data stream comprising video data in excess of a threshold;
    means for temporally shifting said excess video data in said first video data stream relative to said second video data stream; and
    means for recombining said first video data stream with said second video data stream after said first video data stream has been temporally shifted relative to said second video data stream;

a second program generator for generating a second program signal, said second program generator comprising:
    a second video data source for providing a second video signal;
    a second signal splitter coupled to receive said second video signal, said second signal splitter generating a third video data stream and a fourth video data stream, said third video data stream comprising video data in excess of a threshold;
    means for temporally shifting said excess video data in said third video data stream relative to said fourth video data stream; and
    means for recombining said third video data stream with said fourth video data stream after said third video data stream has been temporally shifted relative to said fourth video data stream;

a multiplexer for combining said first and second program signals; and means for broadcasting said program signals to a plurality of remote locations.

2. A system as defined in claim 1 wherein said broadcasting means comprises satellite broadcasting means.

3. A system as defined in claim 1 wherein said broadcasting means comprises:

a transmitter coupled to receive said program signals from said multiplexer;

a satellite coupled to receive said program signals from said transmitter;

a receiver for receiving signals from said satellite; and a decoder connected to receive signals from said receiver.

4. An apparatus as defined in claim 1 wherein said first program generator additionally comprises means for determining the presence of extra channel capacity not utilized by said second video data stream.

5. An apparatus as defined in claim 4 wherein said determining means comprises:

a rate detector coupled to sense said first video signal and generate a rate signal corresponding to the data rate of said first video signal; and a controller for comparing said data rate of said first video signal with a threshold data rate.

6. An apparatus as defined in claim 1 wherein said means for temporally shifting said excess video data in said first video data stream relative to said second video data stream comprises:

a first delay buffer for delaying said first video data stream, said first delay buffer delaying said first video data stream by an adjustable time period; and a second delay buffer for delaying said second video data stream, said second data buffer delaying said second video data stream by a fixed time period.

7. An apparatus as defined in claim 1 wherein said means for recombining said first video data stream with said second video data stream after said first video data stream has been temporally shifted relative to said second video data stream comprises a multiplexer.

8. An apparatus as defined in claim 1 wherein said first program signal has a video portion and an audio portion and wherein said system additionally comprises:

an audio/video separator for separating said audio portion of said first program signal from said video portion of said first program signal;

a buffer for delaying said audio portion of said first program signal; and an audio encoder for encoding said audio portion of said first program signal.

9. An apparatus as defined in claim 1 wherein said first program generator additionally comprising a video encoder for encoding said first video signal before said first video signal is transmitted to said signal splitter.

10. An apparatus as defined in claim 1 wherein said first program generator additionally comprises:

a complexity detector for generating a complexity signal relating to the complexity of said first video signal; and a video encoder for encoding said video signal based upon said complexity signal before said first video signal is transmitted to said first signal splitter.

11. An apparatus for temporally shifting video data within a video signal, said apparatus comprising:

a video data source for providing a video signal;

a signal splitter coupled to receive said video signal, said signal splitter generating a first video data stream and a second video data stream, said first video data stream comprising video data in excess of a threshold;

means for temporally shifting said excess video data in said first video data stream relative to said second video data stream; and means for recombining said first video data stream with said second video data stream after said first video data stream has been temporally shifted relative to said second video data stream.

12. An apparatus as defined in claim 11 additionally comprising means for determining the presence of extra channel capacity not utilized by said second video data stream.

13. An apparatus as defined in claim 12 wherein said determining means comprises:

a rate detector coupled to sense said video signal and generate a rate signal corresponding to the data rate of said video signal; and a controller for comparing said data rate of said video signal with a threshold data rate.

14. An apparatus as defined in claim 11 wherein said means for temporally shifting said excess video data in said first video data stream relative to said second video data stream comprises:

a first delay buffer for delaying said first video data stream, said first delay buffer delaying said first video data stream by an adjustable time period; and a second delay buffer for delaying said second video data stream, said second data buffer delaying said second video data stream by a fixed time period.

15. An apparatus as defined in claim 11 wherein said means for recombining said first video data stream with said second video data stream after said first video data stream has been temporally shifted relative to said second video data stream comprises a multiplexer.

16. An apparatus as defined in claim 11 wherein said video data source also provides a program signal having a video portion and an audio portion and wherein said apparatus additionally comprises:

an audio/video separator for separating said audio portion of said program signal from said video portion of said program signal;

a buffer for delaying said audio portion of said program signal; and an audio encoder for encoding said audio portion of said program signal.

17. An apparatus as defined in claim 11 additionally comprising a video encoder for encoding said video signal before said video signal is transmitted to said signal splitter.

18. An apparatus as defined in claim 11 additionally comprising:

a complexity detector for generating a complexity signal relating to the complexity of said video signal; and a video encoder for encoding said video signal based upon said complexity signal before said video signal is transmitted to said signal splitter.

* * * * *